May 1, 1934.  L. W. HAAS  1,957,335
BLEACHING AGENT FOR FLOUR DOUGH AND PROCESS OF PREPARING
BLEACHED DOUGH FOR WHITE BREAD
Filed Oct. 24, 1931

Inventor
Louis W. Haas.
By Stone, Boyden, Mack & Hahn
Attorneys

Patented May 1, 1934

UNITED STATES PATENT OFFICE 1,957,335

BLEACHING AGENT FOR FLOUR DOUGH AND PROCESS OF PREPARING BLEACHED DOUGH FOR WHITE BREAD

Louis W. Haas, Chicago, Ill., assignor, by mesne assignments, to J. R. Short Milling Company, Chicago, Ill., a corporation of Illinois Application October 24, 1931, Serial No. 570,963

3 Claims. (Cl. 99—10)

This invention relates to a process of bleaching vegetable flour by the use of an all vegetable bleaching agent.

The improvement also provides for details of using the bleaching agent in extremely minute amounts as compared to the volume of flour to be bleached.

A further feature of the invention relates to the incorporation of the bleaching agent in dry form with flour and the maintenance of the mixed agent and flour under storage conditions for indefinite periods, this being in contrast to the original conception of the use of a similar vegetable bleaching agent at the time of the preparation of the dough.

The above specified features of improvement inherent to this invention are founded on the broad idea expressed in the application for Patent Serial 310,673, filed October 5, 1928, by Haas and Bohn and the improvement thereon filed by L. W. Haas, Serial 498,837, filed November 28, 1930, according to both of which inventions the effective bleaching operation proceeds when wheat flour or other flour to be bleached in the presence of air or oxygen, warmth and moisture is incorporated with the all vegetable bleaching agent in quantity sufficient to bring about the desired bleaching action of the flour while the dough is being prepared but is used in such small quantity that the agent does not lend its own color or flavor to the dough or resultant baked product.

In accordance with the present invention and as predicated on the procedure generally described in the above identified applications for patent, the problem is to effect the decolorizing of the carotin, the yellow pigment found in grains, seeds, plants and other vegetation. The vegetable bleaching medium evolved as a result of the inventions described in the two applications is cheap to manufacture, easily obtained in the raw state, is readily, efficiently and satisfactorily used. Bakery products of the highest class have been obtainable when lightly bleached or unbleached flour has been whitened in accordance with the said inventions. Most important, however, is the avoiding of damage to flour, previously a common result found in chemically bleached products.

This invention, therefore, has among its advantages a bleaching power in which the bleaching agent has a nutritive value and is not a foreign body such as are some chemical agents; also the improved agent is harmless to the dough or bread subsequently baked therefrom and is not injurious to the health of the consumer.

In accordance with the improvements of the present invention, it has now been found that 0.0625 of one percent of vegetable bleaching agent can be efficiently used to effect the desired bleaching action. This is an astonishingly low amount of the agent and the importance of this relatively minute amount will be clear from the following detailed description.

The feature of storing the bleaching agent in dry condition with the wheat flour and thus prior to the preparation of the dough will be explained further hereinafter. However, it will be obvious that the permissible incorporation of the agent with the flour renders it possible to prepare such a mixture at the flour mill. While not only avoiding the complications attendant to chemical bleaching problems, it is further possible to prepare and ship the flour and bleaching agent in the correct proportions directly from the miller to the baker and the baker need not be concerned about the proportions of bleaching agent to be used but can be assured that when the dough is prepared the bleaching action will take effect promptly with the incorporation of moisture and under the usual conditions of dough mixing.

Until the introduction of the present invention and the broad principles defined in applications 310,673 and 498,837, above mentioned, there were four principal processes or methods of bleaching flour in commercial use, as follows:

1. With nitrogen peroxide.
2. With chlorine, sometimes containing a small amount of nitrosyl chloride.
3. With nitrogen trichloride.
4. With benzoyl peroxide.

Each of the above processes has certain disadvantages.

The nitrogen peroxide does not bleach the flour to the desired extent. In bleaching with nitrogen trichloride and chlorine it is difficult to obtain uniformity in performing this operation. A slight overbleach with these chemicals seriously damages the flour. Even a normal bleach may cause the flour to deteriorate rapidly in storage. The treatment of flour with these two chemicals, chlorine and nitrogen trichloride, causes more than a mere bleaching of the flour. The protein or gluten of the flour is "oxidized" or developed so that the bread obtained from such bleached flour has more volume and a greater grain and texture refinement than is the case with the unbleached flour. These qualities may be helpful to the baker under certain circumstances, although if a small, compact loaf is desired, they are detrimental. The bleaching process using benzoyl peroxide does not affect the baking process to any marked degree, but has the disadvantage that the reagent used (benzoyl peroxide) is mixed with the flour in such minute amounts that even distribution throughout the flour mass is difficult to obtain. Benzoyl peroxide is also very expensive, and bleaching by this method costs several times as much as by the other processes.

It has been proposed to use as catalyzers to promote the action of the peroxide either chemicals or enzymes of the oxydase or peroxydase class. As one result thereof an advantage is ascribed to the increase in the volume of loaves obtained from the same quantity of untreated flour.

The present invention seeks to eliminate these difficulties and complex treatments by the provision of a bleaching agent that is cheaply and readily prepared; that is easily obtained in the raw state; that in no way affects the flour except to decolorize the carotin therein; that possesses food value; that is efficient and satisfactory in use in that it may be incorporated in the flour when the dough is mixed preparatory to baking the bread, as taught in said prior applications or is incorporated earlier and held in storage as described hereinbefore, thereby eliminating the time and expense of a separate bleaching operation. Both methods eliminate the need for using chemically bleached flour.

This bleaching agent is entirely of vegetable origin and is probably itself an enzyme or enzyme-like substance. When it is present in a dough mixing operation the yellow carotin which gives unbleached flour its characteristic yellowish color is decolorized. It contains an abundance of active bleaching or carotin-removing enzyme. The bleaching property of the agent is destroyed at the temperature of boiling water. It acts rapidly at temperatures between 40 and 50 degrees centigrade, and fairly rapidly at room temperature.

This process of bleaching flour, or more exactly the dough made therefrom, has a number of advantages. In the first place, no chemicals are used. Secondly, the danger of overtreatment of the flour or dough is non-existent since the active principle or bleaching agent employed is an enzyme obtained from a vegetable source. The use of an excess of several times the amount necessary to bleach the flour will cause no damage whatever, although large excessive amounts, if certain beans be used, as for example soy beans, will provide an undesirable bean flour flavor and the color of the soy bean flour will begin to become noticeable since the bleaching action operates selectively to whiten the unbleached wheat flour but does not whiten the bean flour. Thirdly, the baking characteristics of the flour are not changed. Thus, the baker can obtain any desired further development of his dough and gluten by use of a yeast food, high-speed mixing, etc. Fourthly, wheat flour can be manufactured and sold unbleached, in which condition it is best fitted to keep well in storage. It also keeps well when it has the bleaching agent incorporated with it and both are in dry condition.

As at present known, the most practical source of this enzyme material or bleaching agent is the soy-bean, although it is understood that the invention contemplates its use as a carotin-decolorizing agent from whatever source derived. One method of obtaining this enzyme in an active state and by a process commercially practicable, has been described in detail in the application Serial No. 310,673, filed October 5, 1928. By that method, the beans are first soaked in water, then washed and ground to a paste or sludge which is mixed with a gelatinized cereal flour. Other methods, also described in the aforesaid copending application, include grinding the soaked soy-bean paste and drying it in vacuo, then grinding to a powder, and the method of grinding the soaked soy-beans with additional water, subjected to filtration to remove the fiber, and the filtrate dried at a low temperature and ground to a powder. As one example, the beans are soaked for twelve to forty-eight hours in water of approximately room temperature, using enough water to cover the beans at all times. At the end of the steep period, the water is drained off and the beans are well washed with two or three changes of fresh water. At this point the beans have swelled to about three times their original size. After draining off the wash water the beans are ground in a mill which reduces them to a paste or sludge.

By another method of manufacture, the soy-beans, or other source of the enzyme, may be ground to a paste and dried at a low temperature in vacuo, and then ground to a powder. By another method, the soaked soy-beans may be ground with additional water, subjected to filtration through cloth to remove the fiber, and the filtrate, which has the appearance of cow's milk, dried at a low temperature and ground to a powder.

In another embodiment of the invention, as described in application Serial 498,837, the washing and soaking methods described in the application Serial 310,673 and above outlined, as examples, can be dispensed with. One such alternate method of obtaining the material with the enzyme in an active state and by a process commercially practicable, is by treating soy-beans as follows:

Wash the beans to free them from adhering dirt and immediately dry them at a temperature which must not be over 155 degrees F., for a sufficient length of time to reduce their moisture content to 8% or less. It is preferable that the conditions of operation are so chosen that the temperature may be so controlled that it does not rise over 140° F. to 150° F. By this drying process the beans are prepared for milling. After drying the beans to the required moisture content, which may be readily determined by sample analysis, remove the beans from the drying apparatus and grind them to a flour, grinding them in such a way as to cause removal of the hulls as completely as possible by ordinary means i. e., aspiration. Then further reduce the hull-free material to a fine powder, a granulation similar to wheat flour. The finer the granulation, the better, as long as during the process the temperature of the material does not rise above 155°. Under these conditions of drying, the activity of the material is not harmed, while higher drying temperatures would seriously impair the bleaching action of the beans. By this latter method, as taught in application Serial 498,837, the vegetable bleaching material is not subjected to any wetting action after granulation is begun or after the vegetable itself is modified from its original shape. As applied to soy-beans, the beans may be wet or otherwise treated in the process of cleaning them but after being cleaned the material is not further moistened at any stage to the very completion of the bleaching agent.

In the process of grinding and milling, the flour is passed repeatedly through sifting devices, so as to remove any coarse material and to obtain flour of fairly uniform and fine granulation.

The flour thus obtained is then mixed with a filler or diluent so as to reduce the bleaching strength and to improve the keeping qualities of the active bleaching material. It has been that a good dilution is obtained by mixing one part of bean flour with four parts of another finely ground cereal product such as processed corn-flour formerly known to the trade as "Ceratose" and now as "Ceratex".

The mixture just described contains 20% of soy bean material. It has now been proved that of this mixture as little as 0.3125% to 100 lbs. of flour in the dough will have a perceptible bleaching effect and this quantity of bleaching material would be considered as the minimum for practical purposes. This would correspond to 0.0625% of the bean material itself. The amounts which one could safely use without imparting an appreciable foreign flavor to bread was found to be about 2.00% of the mixture, which corresponds to about 0.40% of the soy bean material itself. Above that amount the agents flavor appears noticeable and quality is thus lowered.

According to the present invention, the quantity of soy bean material to be used for bleaching purposes is between 0.0625% and 0.40%. If less than the minimum quantity is used, then little benefit can be observed and if more is used, the flavor of the bread is too adversely affected.

The last step of mixing or dough making just mentioned is preferably done in the presence of air or oxygen in a modern high speed mixer, although mixers having slower speeds may also be used, but with somewhat less satisfactory results. The operation of a preferred form of high-speed mixer may be more readily understood by reference to the accompanying drawing, in which.

Figure 1:
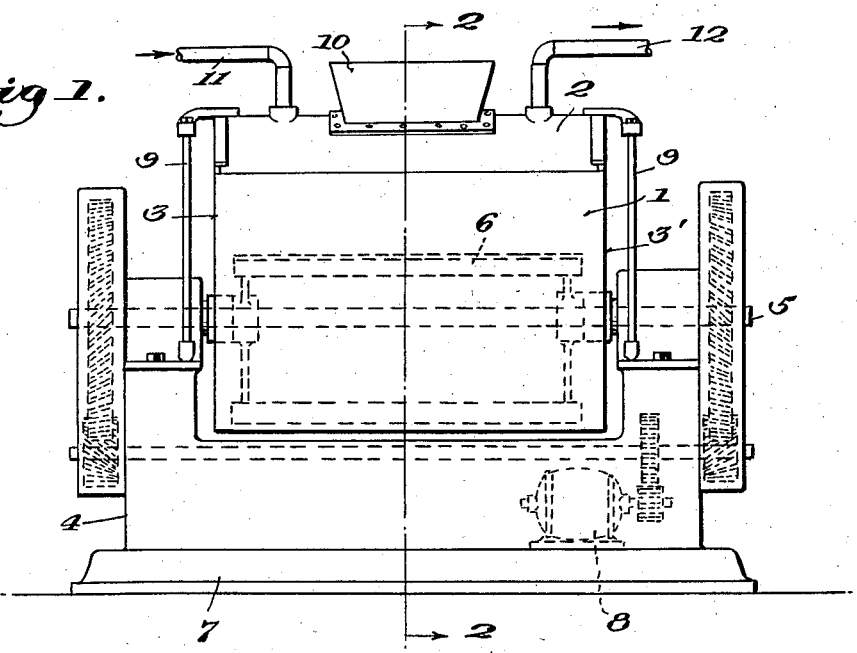
Figure 1 represents a front elevation of a suitable form of mixer.

In the drawing, 1 designates the mixer casing, 2 a stationary cover normally closing the casing 1 and provided with a supply chute 10 for the admission of flour and other ingredients. Air inlet and outlet pipes 11 and 12 respectively are provided through which an aerating medium such as air or oxygen may be circulated by means of a fan or blower (not shown). 3 and 3' represent the ends of the casing. The casing is supported slidably with respect to cover 2 which is held in position by vertical supports 9 rising from housings 4. Housings 4 are of box construction mounted on base 7 and comprising the bearings and supports for the shaft (later to be described) and, through the medium of supports 9, also support the mixing tank. They also provide supports for gear guards or casings which protect the drive gears. The shaft 5, which with the stirring and kneading bars 6 affixed thereto by a spider constitute the mixing and kneading mechanism, is mounted on housings 4 and is rotated by means of an electric motor 8. This motor is one of at least 25 horsepower, and capable of giving to the mixing and kneading mechanism a speed of 60 to 75 revolutions per minute. The tank casing 1 may be turned and lowered through an arc of a circle on an axis eccentric to the axis of shaft 5 by means of a suitable control device for dumping (not shown), so as to discharge the contents through the front face thereof.

Figure 2:
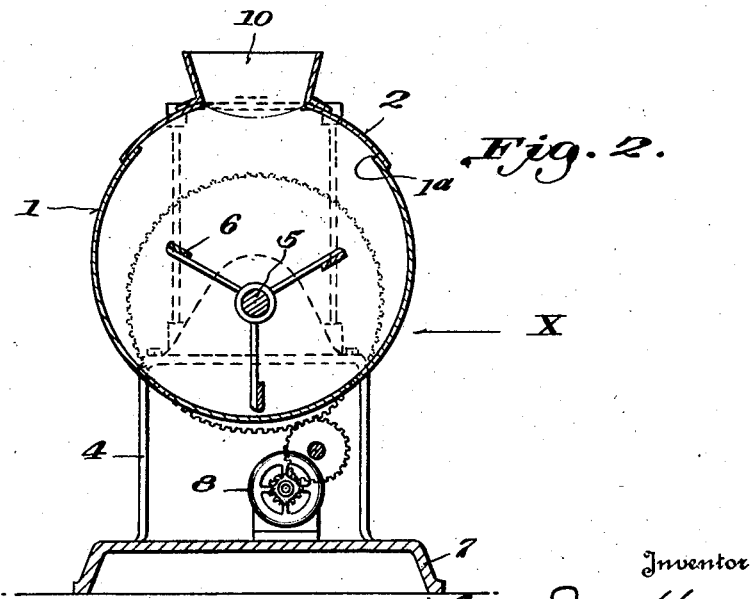
Figure 2 represents a vertical section of the mixer on line 2—2 of Figure 1.

During the dumping operation the casing 1 is moved so that its forward upper edge 1ª is lowered to approximately the point indicated at X in Figure 2. The stirrer arms are then able to push the dough out of the opening thus provided.

In the mixing operation, the dough ingredients are supplied to the tank through chute 10 and the motor is speeded up till the shaft 5 rotates at a steady speed of 60 to 75 revolutions per minute. The supply of aerating fluid preferably air, is then turned on and owing to the influence of the high speed mixer the dough is so well agitated and stretched out and clotted together and again stretched out, that practically every particle of the dough comes to the outside and in contact with the air. It is probably due to this contact with air that the bleaching effect of the carotin decolorizing agent is greatly promoted. Evidently the dough containing the agent takes up the oxygen of the air very quickly and this absorption of oxygen, therefore, is increased with an increased dough surface and vigorous high speed mixing. The dump control device is then put into operation, and the dough batch is discharged forwardly into suitable receptacles.

It is to be understood that the device illustrated in the drawing is merely one embodiment of the type of mixer which it is desired to employ. Other types of high-speed mixers might also be used to good advantage, provided that they are equipped with adequate means for the circulation of an aerating medium, and are capable of sustaining a speed of 60 revolutions of the agitator per minute or more. The mixing could, of course, be done by other methods, but the high speed aerating mixer method is by far the most satisfactory.

The invention is not limited to the use of soy-bean material alone, as other types of vegetable material have been found to contain active carotin removing enzymes, though to a somewhat less extent than soy-beans.

As to other sources of bleaching material, it has been found that most other common legumes, i. e. beans, peas, lentils, etc. contain some bleaching material principle. However, they are all inferior in this respect to the soy-bean. Navy beans, kidney beans, lima beans, and other beans contain only about half as much active ingredient. Lentils and peas, including green peas and yellow split peas, seem to contain a little more than beans, but their strength, too, is much lower than that of soy beans. In addition, these other beans and legumes are much higher in price than soy-beans, so that soy-beans seem to be the most practical source of bleaching principle. It has been found that horse radish and turnips possess bleaching properties, but they, too, are inferior to the soy-beans as to potency and are much more expensive. In addition, these impart a very undesirable odor and flavor to bread. The raw, fresh potato also shows some bleaching effect, but not nearly as much as the legumes. Various types of seeds, tubers, bulbs, and nuts, especially peanuts, have shown some bleaching effect, but much less than soy-beans.

A few additional examples will help to show the way in which some of the other materials may be used.

I. Potatoes and turnips are used in the following way: Both materials were cleaned and peeled and then pulped and used to the extent of 1% of the total flour. The effect of bleaching is then noted in the usual way.

II. Dried preparations of the cleaned and peeled potatoes and turnips are made by drying the pulp prepared in the above way at a temperature not exceeding 120° F. Of the dried material 0.50% was used of the total flour.

Tests show that at least 0.50% of the dried potato or turnip pulp is necessary to effect a noticeable bleaching but even then the bleaching is not nearly so strong as with much smaller quantities of pulverized legumes.

To use potatoes and turnips as bleaching materials, it is desirable to mix one to two parts of the dried material with one half to one part of prepared corn flour ("Ceratex"). Of course, this mixture could also be prepared by using the undried pulp, in corresponding quantity, and then effect drying in such a way that the temperature during the drying process does not rise above 140° to 150° F.

The use of navy beans, lentils, and yellow split peas proves their effectiveness. However, these materials are much more expensive than soy beans and they are not quite as efficient as the latter.

III. The navy beans, lentils, and split peas are either ground dry until the flour passed an 80 mesh sieve or these materials were soaked for eighteen to twenty-four hours in water at room temperature and then dried at a temperature below 120° F. and the dried material ground to pass through an 80 mesh sieve. Baking tests have been made then with these materials using 0.25% to 0.50% of the flour obtained from the soaked, as well as the unsoaked legumes. In all cases, distinct bleaching was observed, but the effect was inferior to the effect obtainable with corresponding quantities of soy bean material.

Lentils prove a little more effective than peas and peas a little more than navy beans, but even the lentils are not quite so strong as the bleaching effect of corresponding quantities of soy bean.

If the strength of soy-bean is arbitrarily designated as "100", then lentils show a bleaching effect of about 85; yellow split peas about 75, navy beans about 70. These relative bleaching strengths determine the quantity of the leguminous material to be blended with Ceratex.

As at present about twenty parts of soy-bean flour (from unsoaked beans) is used to eighty parts of Ceratex, it is necessary to blend about twenty-four parts of ground lentils with seventy-six parts of Ceratex, and twenty-seven parts of ground yellow split peas with seventy-three parts of Ceratex and about thirty parts of navy bean flour with seventy parts of Ceratex.

If the flour from the raw, that is, unsoaked beans, lentils, and peas is blended with Ceratex in the above mentioned proportions, preparations will be obtained which possess about the same bleaching strength as a mixture of twenty parts of soy-bean with eighty parts of Ceratex.

It is of interest to note that the bleaching strength of any of the legumes mentioned is but slightly affected by soaking. Soaking seems to have a slightly beneficial effect in the case of lentils, while the effect with beans and peas seems to be negligible.

It is further important to note another point which has a marked bearing on the bleaching action obtainable. It has been found that very thorough mixing, especially with high speed mixing machines, as described herein, is an essential requirement, to obtain best bleaching results. Doughs mixed by hand or in the old type so-called "slow speed" mixers do not improve much in color, no matter how much bleaching material is added, unless the doughs are very slack or soft. It would seem that the incorporation of air (especially oxygen in the air) is very beneficial and necessary.

All the commercial bean flours investigated in the development of this invention have shown little or no bleaching strength. They evidently have been produced in such a way as to harm the bleaching principle contained in the raw beans. No doubt the beans were heated higher than the temperature specified herein, either to produce a more agreeable flavor of the bean flour or to prepare the beans for the extraction of the oil. This is especially true with the commercial soybean flours on the market, according to which, even though the beans have a rather high oil content (about 20%), it is necessary to heat the beans to facilitate expelling the oil, and always to a temperature too high for the enzyme to retain its qualities.

Experience has shown that the bleaching agent may be mixed with unbleached flour at the mill, and that the mixture may be kept indefinitely without deterioration, so long as it is maintained in the dry state. In fact, mixtures of flour and bleaching agent have been held in storage for months and subsequently used in the preparation of satisfactory dough, the bleaching properties apparently not being lessened by storage. Such storage tests have been applied to the bleaching agent alone and without admixture of the cereal flour, i. e. processed corn flour carrier known as "Ceratex" and also in combination with the carrier, and in such storage tests for either variety in combination with flour there has apparently been no tendency toward decomposition during storage or lessened bleaching power when moisture was subsequently added at the time of the preparation of the dough.

One formula of proportions and ingredients suitable for use with either .0625% of soy bean bleaching agent up to 0.40% or thereabouts may include the following:

| | | |
|---|---|---|
| Flour | 100 | pounds |
| Water | 62 | pounds |
| Yeast | 1¾ | pounds |
| Salt | 2 | pounds |
| Sugar | 5 | pounds |
| Dry skim milk | 3 | pounds |
| Malt | 1 | pound |
| Fat | 3 | pounds |
| Yeast food | 6 | ounces |

The proportions of bleaching agent to flour are based on comparative weight.

Emphasis is placed in this case, as in copending application Serial 498,837, on the fact that the beans are used in the raw state, i. e. they have not been heat treated at a sufficient temperature to destroy the bleaching power. The bean material is not used in quantity large enough to give its own yellow color or its peculiar flavor to the baked product.

In the foregoing, mention has been made of the possibility of obtaining bleaching action by slow speed mixing with doughs which are very slack or soft. In further explanation of how such procedure may be conducted, it may be pointed out that the softness or slackness is obtained by withholding a substantial proportion of the flour when the dough batch is mixed, while yet including all of the other ingredients. The dough is thus maintained sufficiently soft to be worked fairly easily by hand or with the slow speed operation in which the mixers operate from twenty to thirty-five R. P. M. Under such conditions the bleaching agent has an opportunity to act, and after bleaching is effected to the extent desired, the remaining portion of flour is added in the last few minutes of mixing time. The amount of flour to be withheld depends on the amount of the remaining ingredients and the power and speed of the machinery, and is within the ready knowledge of the baker once he has become acquainted with the general proposition of using the bleaching agent of this invention. No peculiar problem is involved in making slack doughs. However, this invention does teach the possibility of effecting bleaching action with the use of slack doughs and under conditions of slow speed mixing, by hand or machinery.

The foregoing disclosure regarding slow speed mixing of slack dough is described and claimed in my copending application for patent Serial No. 692,903, filed October 9, 1933.

I claim:

1. A process of making bread comprising incorporating with unbleached or lightly bleached flour to further bleach it and with other ingredients to form a dough batch, a carotin-decolorizing agent comprising a vegetable material in proportions of approximately 0.0625% by weight to the weight of the flour.

2. A process of making bread comprising incorporating with unbleached or lightly bleached flour to further bleach it and with other ingredients to form a dough batch, a carotin-decolorizing agent comprising a vegetable material in proportions of approximately 0.0625% to 0.30% by weight to the weight of the flour.

3. An article of sale comprising lightly bleached or unbleached wheat flour having incorporated with it a carotin-decolorizing agent of vegetable material having the quality of effecting the bleaching of the wheat flour when in the presence of the moisture of dough while the dough is being worked in proportions of approximately 0.0625% and not more than 0.30% by weight to the weight of the flour, both agent and flour being dry.

LOUIS W. HAAS.